(12) United States Patent
Brima et al.

(10) Patent No.: US 12,255,975 B2
(45) Date of Patent: Mar. 18, 2025

(54) NETWORK PACKET PROCESSOR FOR PROCESSING A DATA PACKET

(71) Applicant: HUAWEI TECHNOLOGIES CO., LTD., Guangdong (CN)

(72) Inventors: Yariv Brima, Hod Hasharon (IL); Yoni Bick, Hod Hasharon (IL); Nan Li, Beijing (CN); Shunfang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 17/668,843

(22) Filed: Feb. 10, 2022

(65) Prior Publication Data
US 2022/0166859 A1 May 26, 2022

Related U.S. Application Data

(63) Continuation of application No. PCT/EP2019/071748, filed on Aug. 13, 2019.

(51) Int. Cl.
*H04L 69/22* (2022.01)
*H04L 49/00* (2022.01)
*H04L 49/101* (2022.01)

(52) U.S. Cl.
CPC ............ *H04L 69/22* (2013.01); *H04L 49/101* (2013.01); *H04L 49/3063* (2013.01)

(58) Field of Classification Search
CPC .... H04L 69/22; H04L 49/101; H04L 49/3063
See application file for complete search history.

(56) References Cited

U.S. PATENT DOCUMENTS

| | | | | |
|---|---|---|---|---|
| 4,811,210 A | * | 3/1989 | McAulay | ............... G10L 15/12 385/17 |
| 9,525,760 B1 | * | 12/2016 | Boden | ..................... H04L 69/22 |
| 2012/0320921 A1 | | 12/2012 | Barnes et al. | |

OTHER PUBLICATIONS

PCT International Search Report and Written Opinion issued in International Application No. PCT/EP2019/071748 on Nov. 22, 2019, 11 pages.

* cited by examiner

*Primary Examiner* — Samina F Choudhry
(74) *Attorney, Agent, or Firm* — Fish & Richardson P.C.

(57) ABSTRACT

A partial packet context builder can determine a partial packet context associated with a data packet based upon packet context associated with the data packet, the partial packet context including a plurality of partial packet context fields, where a network packet processor including an action unit, the action unit including the partial packet context builder, a systolic array of arithmetic-logical units (ALUs), and a packet context builder, the packet context including a plurality of packet context fields. The systolic array of ALUs can process the partial packet context to provide a processed partial packet context, the processed partial packet context including a plurality of processed partial packet context fields. The packet context builder can merge the processed partial packet context with the packet context to provide a processed packet context.

20 Claims, 8 Drawing Sheets

A NETWORK PACKET PROCESSOR FOR
PROCESSING A DATA PACKET

CROSS-REFERENCE TO RELATED
APPLICATIONS

This application is a continuation of International Application No. PCT/EP2019/071748, filed on Aug. 13, 2019, the disclosure of which is hereby incorporated by reference in its entirety.

TECHNICAL FIELD

The invention relates to the field of network packet processing. In particular, the invention relates to an improved processing of data packets within a match-action pipeline.

BACKGROUND

Typically, packet processing within a network packet processor is performed by several match-action (MA) units arranged in a match-action pipeline. An exemplary match-action pipeline is shown in FIG. 4. An exemplary architecture of an action unit is shown in FIG. 5.

Within an action unit, processing of the data packet is typically performed by a systolic array of arithmetic-logical units (ALUs), i.e. a matrix of N ALUs in M stages, which operate on a packet context associated with the data packet to be processed. Typically, each ALU of the systolic array has to read from the packet context through input crossbar elements and has to write back the results to the packet context through output crossbar elements. Since a packet context size of several hundred bytes is typically employed, a very large number of crossbar elements between the packet context and ALUs is required.

The very large number of required crossbar elements, however, leads to a very large area on the chip and may lead to a high power consumption of the network packet processor. In addition, the very large number of required crossbar elements typically also leads to timing closure problems on the chip.

SUMMARY

It is an object of the invention to provide an improved network packet processor for processing a data packet.

This object is achieved by the features of the independent claims. Further implementation forms are apparent from the dependent claims, the description and the figures.

The invention is based on the factual finding that each match-action unit within a match-action pipeline handles only a limited functionality, for example tunnel termination, forwarding, telemetry, etc. Therefore, within a specific match-action unit, the ALUs of the systolic array need to access only a part of the packet context; both regarding the input crossbar elements and the output crossbar elements. Before the start of the processing by the systolic array of ALUs, only the fields that are used are extracted into a partial packet context in the respective action unit. Each ALU can then read and write to/from the partial packet context only. Therefore, the required number of crossbar elements and the corresponding area and timing requirements on the chip are reduced. At the end of the systolic array processing, the processed partial packet context is merged, i.e. written back, into the packet context. In parallel, the original packet context is buffered by a FIFO buffer until the merge with the processed partial packet context.

According to a first aspect, the invention relates to a network packet processor for processing a data packet. A packet context is associated with the data packet, the packet context comprising a plurality of packet context fields. The network packet processor comprises an action unit. The action unit comprises a partial packet context builder configured to determine a partial packet context associated with the data packet based upon the packet context, the partial packet context comprising a plurality of partial packet context fields. The action unit further comprises a systolic array of ALUs configured to process the partial packet context to provide a processed partial packet context, the processed partial packet context comprising a plurality of processed partial packet context fields. The action unit further comprises a packet context builder configured to merge the processed partial packet context with the packet context to provide a processed packet context. The number of partial packet context fields is smaller than the number of packet context fields, since the partial packet context fields are partly drawn from the packet context fields.

In a first implementation form of the network packet processor according to the first aspect as such, the network packet processor further comprises a match unit configured to perform pattern matching within the data packet to provide a response, wherein the action unit is configured to merge the response with the packet context. Thereby, the packet context is updated.

In a second implementation form of the network packet processor according to the first aspect as such or any implementation form thereof, the partial packet context builder is configured to transfer at least one packet context field of the plurality of packet context fields into the partial packet context.

In a third implementation form of the network packet processor according to the first aspect as such or any implementation form thereof, the packet context builder is configured to transfer at least one processed partial packet context field of the plurality of processed partial packet context fields into the processed packet context.

In a fourth implementation form of the network packet processor according to the first aspect as such or any implementation form thereof, each ALU of the systolic array of ALUs is configured to access only the plurality of partial packet context fields and the plurality of processed partial packet context fields.

In a fifth implementation form of the network packet processor according to the first aspect as such or any implementation form thereof, a size of the partial packet context is less than a size of the packet context.

In a sixth implementation form of the network packet processor according to the first aspect as such or any implementation form thereof, the systolic array of ALUs is operable in a plurality of subsequent ALU stages, wherein the systolic array of ALUs is configured to process the partial packet context to provide the processed partial packet context in a first ALU stage, and wherein the systolic array of ALUs is configured to reprocess the processed partial packet context of the first ALU stage as a partial packet context in a second ALU stage. Analogously, a further reprocessing may be performed in subsequent ALU stages.

In a seventh implementation form of the network packet processor according to the sixth implementation form of the first aspect, each subsequent ALU stage of the plurality of subsequent ALU stages is traversed within a single processing clock cycle of the network packet processor.

In an eighth implementation form of the network packet processor according to the first aspect as such or any implementation form thereof, each ALU of the systolic array of ALUs is implemented as a hard-wired circuit.

In a ninth implementation form of the network packet processor according to the first aspect as such or any implementation form thereof, each ALU of the systolic array of ALUs is configured to perform at least one arithmetic operation and/or at least one logical operation and/or at least one data manipulation operation on at least one partial packet context field.

In a tenth implementation form of the network packet processor according to the first aspect as such or any implementation form thereof, the action unit further comprises a plurality of crossbar elements interconnecting the plurality of partial packet context fields with the systolic array of ALUs, and/or interconnecting the systolic array of ALUs with the plurality of processed partial packet context fields.

In an eleventh implementation form of the network packet processor according to the first aspect as such or any implementation form thereof, the action unit further comprises a FIFO buffer configured to buffer the packet context within the action unit, and to provide the packet context to the packet context builder.

In a twelfth implementation form of the network packet processor according to the first aspect as such or any implementation form thereof, the partial packet context builder, the systolic array of ALUs, and/or the packet context builder are each programmable using a microcode.

In a thirteenth implementation form of the network packet processor according to the first aspect as such or any implementation form thereof, the match unit and/or the action unit form part of a match-action-pipeline for processing the data packet within the network packet processor.

According to a second aspect, the invention relates to a network switch for switching a data packet within a communication network. The network switch comprises a communication interface configured to receive the data packet. The network switch further comprises a network packet processor for processing the data packet according the first aspect as such or any implementation form thereof.

According to a third aspect, the invention relates to a method of operating a network packet processor for processing a data packet. The network packet processor comprises an action unit. The action unit comprises a partial packet context builder, a systolic array of ALUs, and a packet context builder. A packet context is associated with the data packet, the packet context comprising a plurality of packet context fields. The method comprises determining, by the partial packet context builder, a partial packet context associated with the data packet based upon the packet context, the partial packet context comprising a plurality of partial packet context fields, processing, by the systolic array of ALUs, the partial packet context to provide a processed partial packet context, the processed partial packet context comprising a plurality of processed partial packet context fields, and merging, by the packet context builder, the processed partial packet context with the packet context to provide a processed packet context.

The method may be performed by the network packet processor and/or the network switch. Further features of the method directly result from the features and/or the functionality of the network packet processor and/or the network switch.

According to a fourth aspect, the invention relates to a computer program product comprising a machine-readable code, in particular a microcode, for performing the method according to the third aspect.

The invention can be implemented in hardware and software.

BRIEF DESCRIPTION OF THE DRAWINGS

Embodiments of the invention will be described with respect to the following figures, in which.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be practiced. It is understood that other aspects may be utilized, and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding network packet processor and/or network switch configured to perform the method, and vice versa. For example, if a specific method step is described, a corresponding network packet processor and/or network switch may include a unit to perform the described method step, even if such unit is not explicitly described or illustrated in the figures. Further, it is understood that the features of the various exemplary aspects described herein may be combined with each other, unless specifically noted otherwise.

Figure 1:
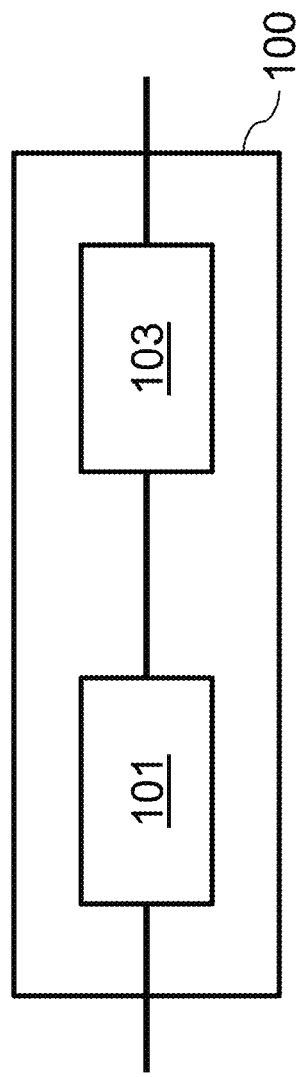
FIG. 1 shows a diagram of a network packet processor for processing a data packet.

FIG. 1 shows a diagram of a network packet processor 100 for processing a data packet. A packet context is associated with the data packet, the packet context comprising a plurality of packet context fields. The network packet processor 100 comprises a match unit 101 and an action unit 103.

The match unit 101 is configured to perform pattern matching within the data packet to provide a response, wherein the action unit 103 is configured to merge the response with the packet context. The action unit 103 comprises a partial packet context builder configured to determine a partial packet context associated with the data packet based upon the packet context, the partial packet context comprising a plurality of partial packet context fields. The action unit 103 further comprises a systolic array of ALUs configured to process the partial packet context to provide a processed partial packet context, the processed partial packet context comprising a plurality of processed partial packet context fields. The action unit 103 further comprises a packet context builder configured to merge the processed partial packet context with the packet context to provide a processed packet context.

Figure 2:
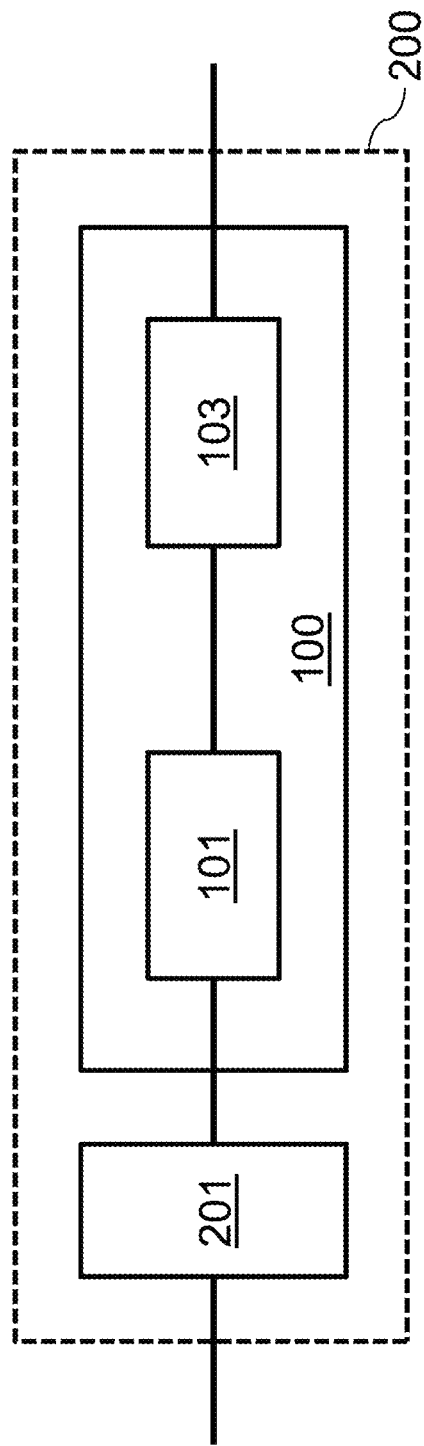
FIG. 2 shows a diagram of a network switch for switching a data packet.

FIG. 2 shows a diagram of a network switch 200 for switching a data packet within a communication network.

The network switch 200 comprises a communication interface 201 configured to receive the data packet. The network switch 200 further comprises a network packet processor 100 for processing the data packet as described with reference to FIG. 1.

Figure 3:
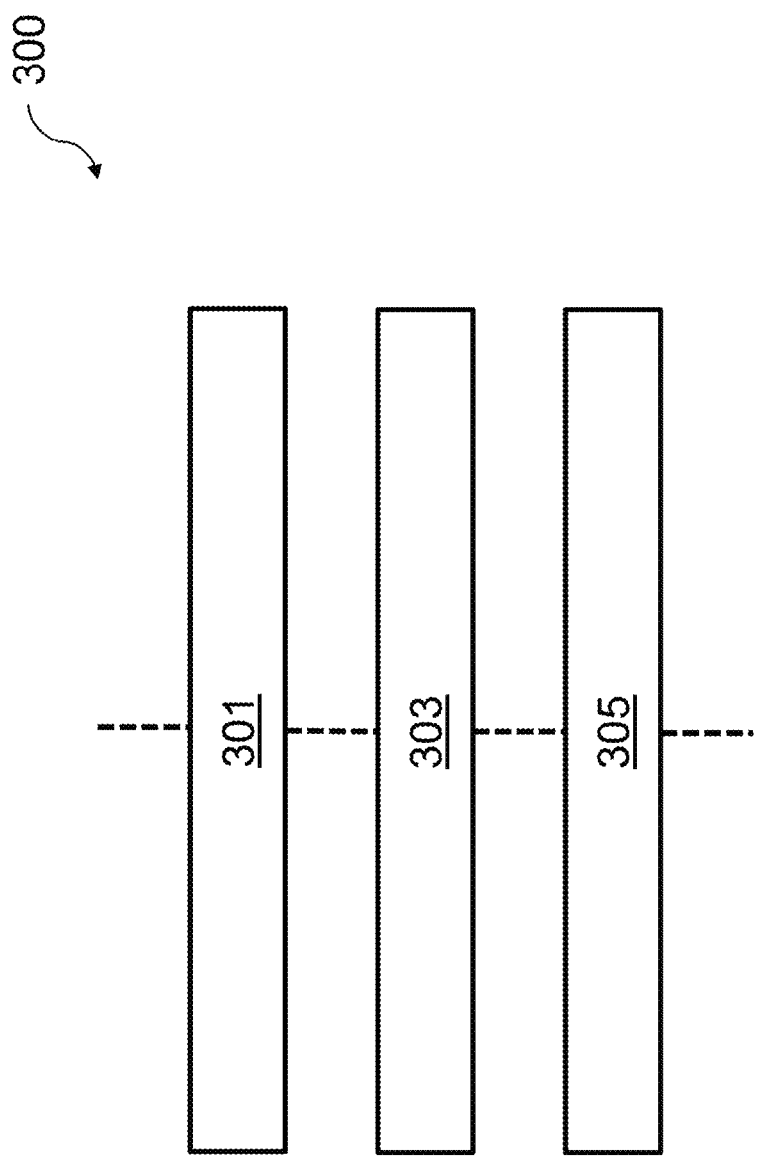
FIG. 3 shows a diagram of a method of operating a network packet processor.

FIG. 3 shows a diagram of a method 300 of operating a network packet processor for processing a data packet. The network packet processor comprises an action unit. The action unit comprises a partial packet context builder, a systolic array of ALUs, and a packet context builder. A packet context is associated with the data packet, the packet context comprising a plurality of packet context fields.

The method 300 comprises determining 301, by the partial packet context builder, a partial packet context associated with the data packet based upon the packet context, the partial packet context comprising a plurality of partial packet context fields, processing 303, by the systolic array of ALUs, the partial packet context to provide a processed partial packet context, the processed partial packet context comprising a plurality of processed partial packet context fields, and merging 305, by the packet context builder, the processed partial packet context with the packet context to provide a processed packet context.

The method 300 may be performed using a computer program product comprising a machine-readable code, in particular a microcode.

Figure 4:
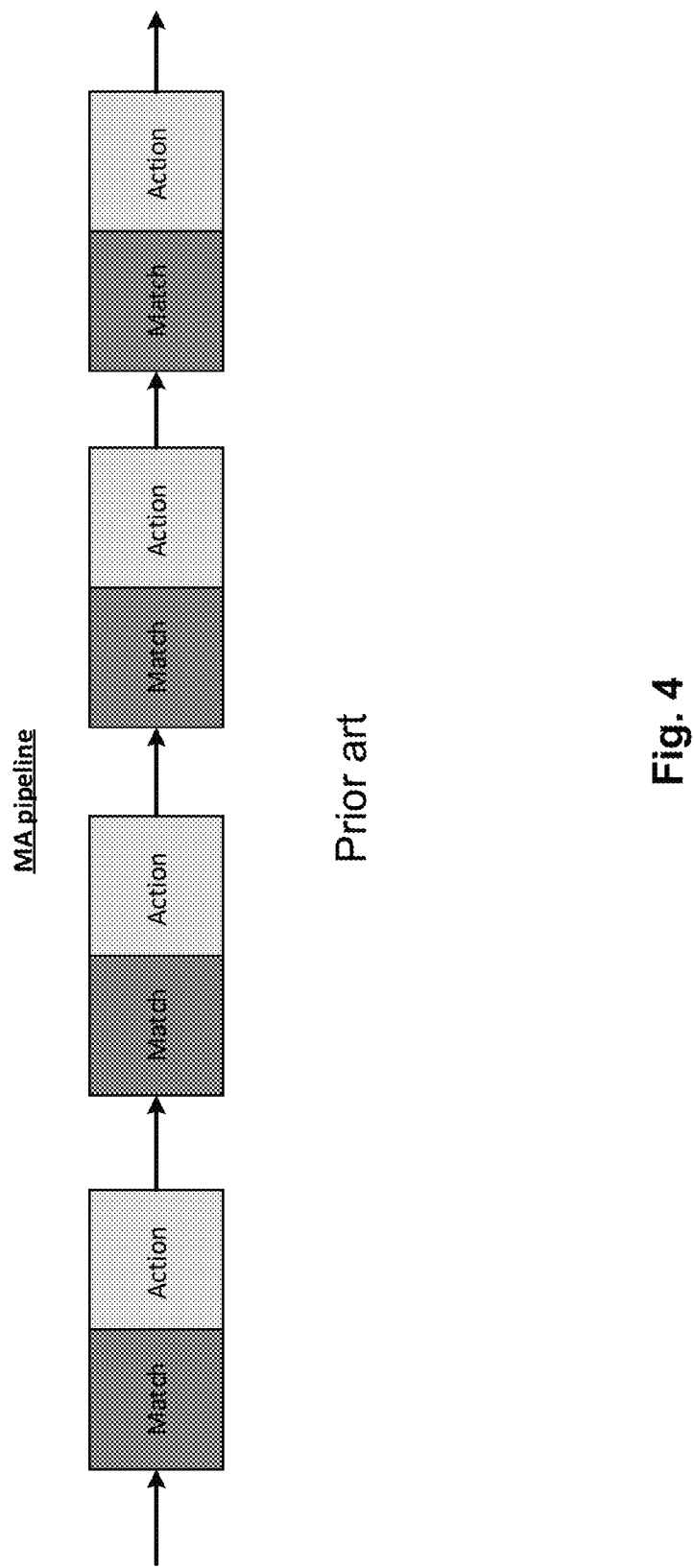
FIG. 4 shows a diagram of a prior art match-action pipeline.

FIG. 4 shows a diagram of a prior art match-action pipeline. A programmer may define the required set of matches and actions in order to process a data packet. The corresponding definitions are then translated to corresponding sets of configurations, microcode (uCode) and search table configurations. The search tables may be configured by microcode and may be accessed by the match unit. The microcode may further be used in the action unit.

The match-action pipeline can usually handle a new data packet every processing clock cycle. In the match unit, it may build search keys for different lookup types and tables, and may build branch keys that may execute if-else conditions.

Figure 5:
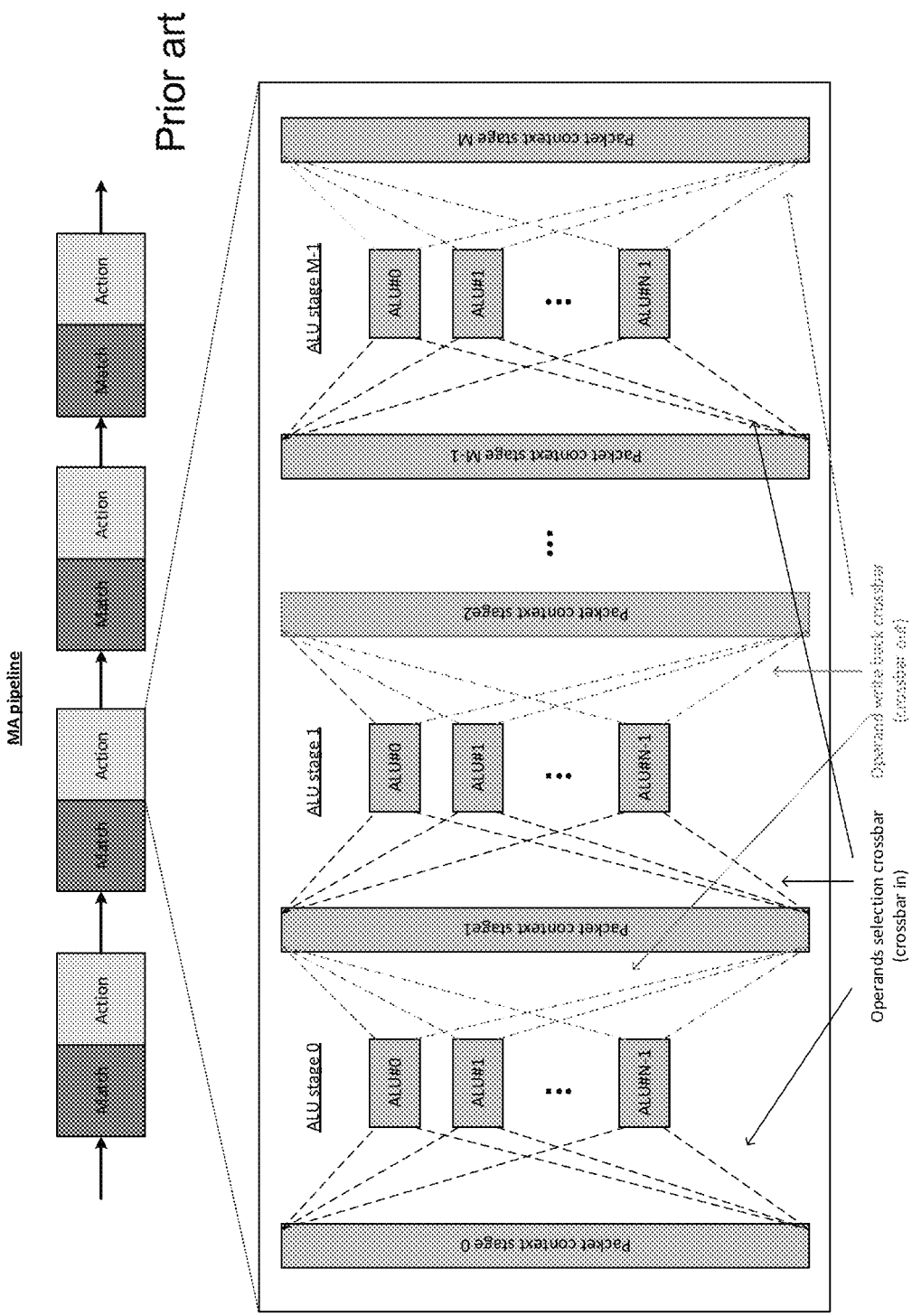
FIG. 5 shows a diagram of a prior art architecture of an action unit.

FIG. 5 shows a diagram of a prior art architecture of an action unit. In the action unit, arithmetic-logical-units (ALUs) are provided that may operate on the packet context. In particular, there may be a pipeline of ALUs that process microcode that the programmer may have defined. The ALUs are arranged in a systolic array, i.e. a matrix of N ALUs in M stages.

Each ALU may read from a packet context based on the data packet as arriving at the MA units and the search response that returns from the search table, and may write back to update the packet context. In each stage of the systolic array, for each ALU there is a very large number of crossbar elements between the packet context and the ALUs. Each ALU usually performs (i) source read: read the source operands from the packet context through the input crossbar elements; (ii) operation on the operand(s) (logic, arithmetic or data manipulation); and (iii) write back of the ALU output: write the results to the correct destination in the packet context through the output crossbar elements. Usually, a packet context size of several hundred bytes is used; thus leading to a very large number of crossbar elements between the packet context and the ALUs.

Figure 6:
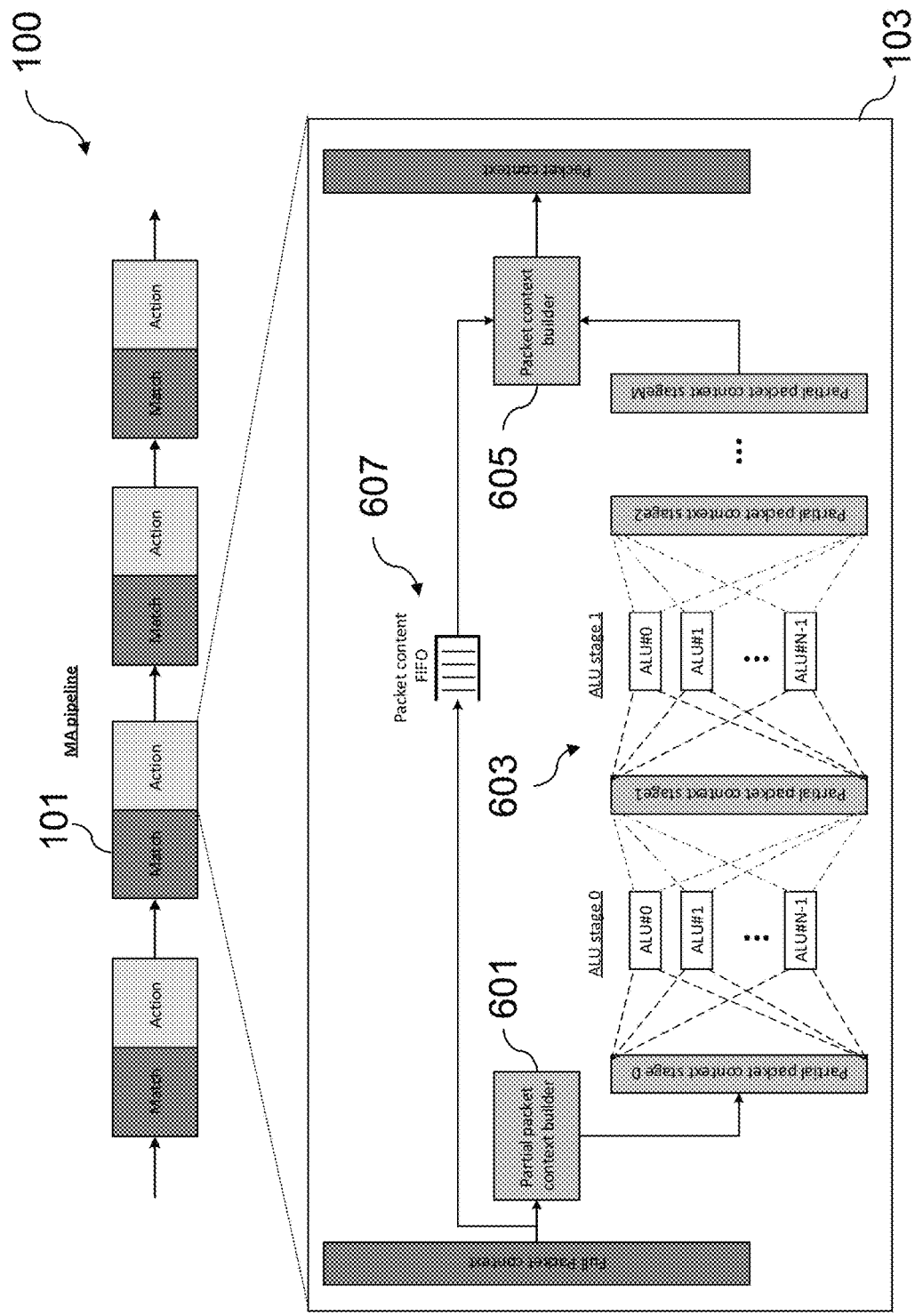
FIG. 6 shows a diagram of a network packet processor for processing a data packet.

FIG. 6 shows a diagram of a network packet processor 100 for processing a data packet. A packet context is associated with the data packet, the packet context comprising a plurality of packet context fields. The network packet processor 100 comprises a match unit 101 and an action unit 103 forming part of a match-action-pipeline for processing the data packet within the network packet processor 100.

The match unit 101 is configured to perform pattern matching within the data packet to provide a response, wherein the action unit 103 is configured to merge the response with the packet context.

The action unit 103 comprises a partial packet context builder 601 configured to determine a partial packet context associated with the data packet based upon the packet context, the partial packet context comprising a plurality of partial packet context fields. The action unit 103 further comprises a systolic array 603 of ALUs configured to process the partial packet context to provide a processed partial packet context, the processed partial packet context comprising a plurality of processed partial packet context fields. The action unit 103 further comprises a packet context builder 605 configured to merge the processed partial packet context with the packet context to provide a processed packet context. The partial packet context builder 601, the systolic array 603 of ALUs, and/or the packet context builder 605 are each programmable using a microcode. The action unit 103 further comprises a plurality of crossbar elements interconnecting the plurality of partial packet context fields with the systolic array 603 of ALUs, and/or interconnecting the systolic array 603 of ALUs with the plurality of processed partial packet context fields. The action unit 103 further comprises a FIFO buffer 607 configured to buffer the packet context within the action unit 103, and to provide the packet context to the packet context builder 605.

The partial packet context builder 601 is configured to transfer at least one packet context field of the plurality of packet context fields into the partial packet context. The packet context builder 605 is configured to transfer at least one processed partial packet context field of the plurality of processed partial packet context fields into the processed packet context.

Each ALU of the systolic array 603 of ALUs is configured to access only the plurality of partial packet context fields and the plurality of processed partial packet context fields. Therefore, the size of the partial packet context is less than the size of the packet context.

The systolic array 603 of ALUs is operable in a plurality of subsequent ALU stages, wherein the systolic array 603 of ALUs is configured to process the partial packet context to provide the processed partial packet context in a first ALU stage, and wherein the systolic array 603 of ALUs is configured to reprocess the processed partial packet context of the first ALU stage as a partial packet context in a second ALU stage. Analogously, a further reprocessing may be performed in subsequent ALU stages. For example, a third ALU stage may reprocess the processed partial packet context of the second ALU stage, and so forth. Each subsequent ALU stage of the plurality of subsequent ALU stages is traversed within a single processing clock cycle of the network packet processor 100. Each ALU of the systolic array 603 of ALUs is configured to perform at least one arithmetic operation and/or at least one logical operation and/or at least one data manipulation operation on at least one partial packet context field. Each ALU of the systolic array 603 of ALUs is implemented as a hard-wired circuit.

Figure 7:
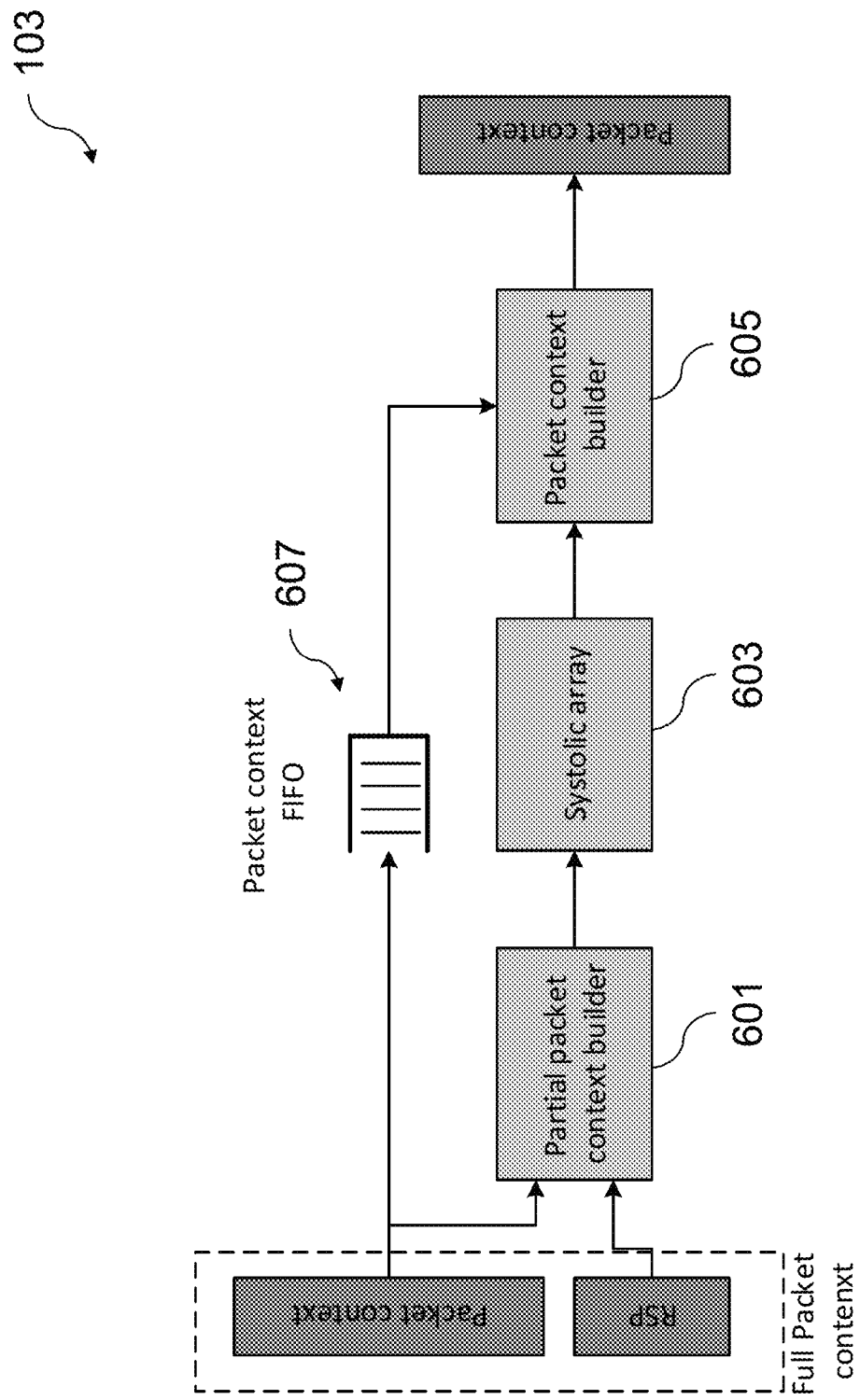
FIG. 7 shows a diagram of an action unit comprising a partial packet context builder, a systolic array of ALUs, a packet context builder, and a FIFO buffer.

FIG. 7 shows a diagram of an action unit 103 comprising a partial packet context builder 601, a systolic array 603 of ALUs, a packet context builder 605, and a FIFO buffer 607. The action unit 103 has the same features and/or functionality as the action unit 103 as described with reference to FIG. 6.

Within the action unit 103, only a part of the packet context needs to have access by the systolic array 603 of ALUs. Within each match-action unit, the partial packet context can be different according to the respective requirements. For each match-action unit, the packet context that is needed can be defined—either for read or modification. Fields that are only overwritten do not need to be copied to the partial packet context. They may rather be overwritten at the packet context builder 605.

In other words, the partial packet context may be built from the full packet context. In parallel, the original packet context may be stored in the FIFO buffer 607. The ALUs within the systolic array 603 can access only the partial packet context as needed. At the end of processing by the systolic array 603, the packet context builder 605 may update the packet context based on the updated partial packet context.

The efficiency of this approach may e.g. depend on the efficiency of the partial packet context builder 601 before the systolic array 603, the packet context builder 605 after the systolic array 603, the number of ALUs within the systolic array 603, and the partial packet context size compared to the full packet context size.

As an example, the packet context size may be ~512B, the partial packet context size may be ~128-192B, and the ALU access in word resolution may be 4B. Therefore, the input crossbar elements for each ALU from the full packet context would require a crossbar of 128×1 compared to a crossbar of 32-48 from the partial packet context.

Figure 8:
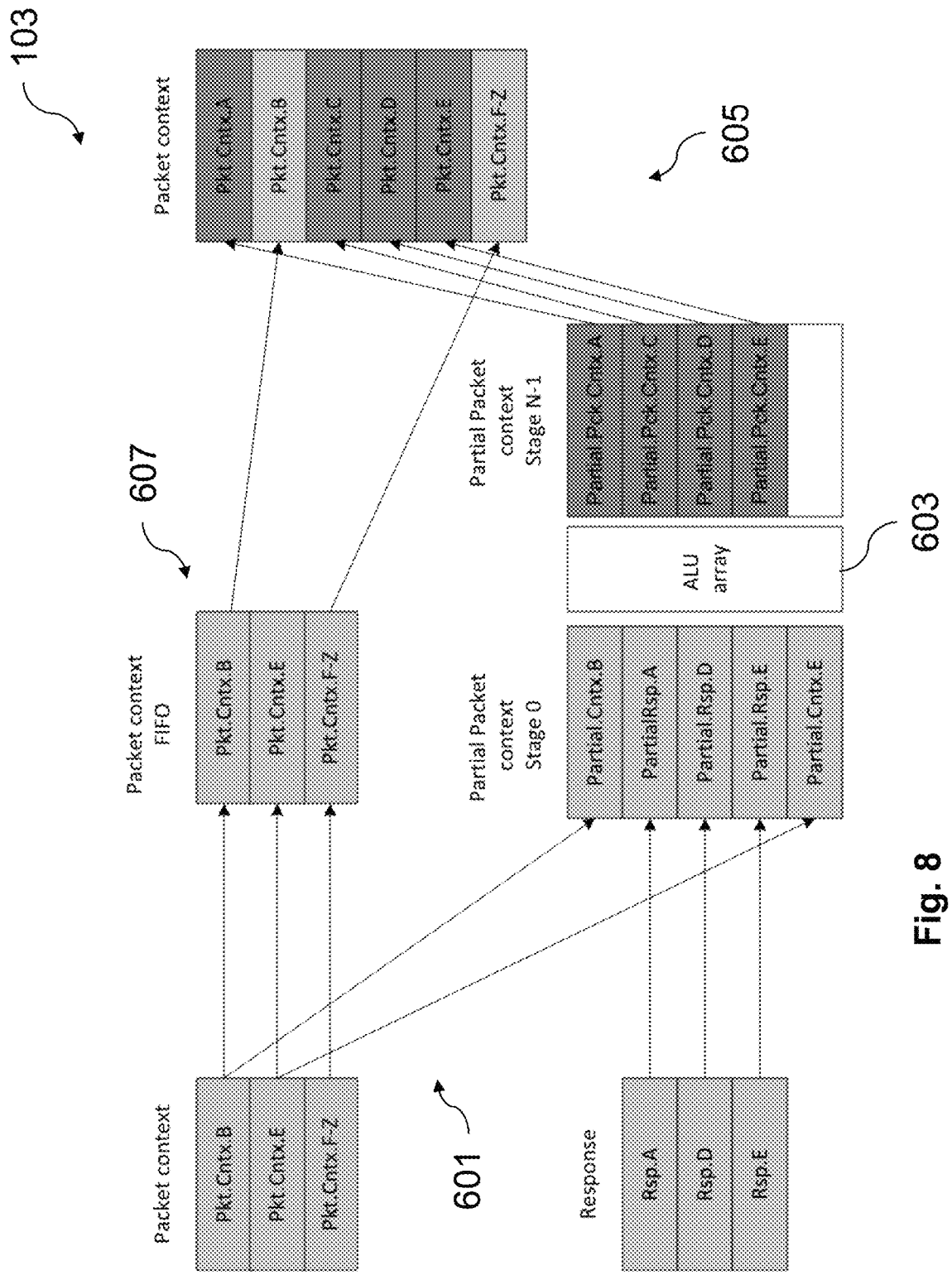
FIG. 8 shows a diagram of an action unit comprising a partial packet context builder, a systolic array of ALUs, a packet context builder, and a FIFO buffer.

FIG. 8 shows a diagram of an action unit 103 comprising a partial packet context builder 601, a systolic array 603 of ALUs, a packet context builder 605, and a FIFO buffer 607. The action unit 103 has the same features and/or functionality as the action unit 103 as described with reference to FIGS. 6 and 7.

A full packet context may e.g. include the packet context that entered the match-action unit, and looked-up response data. Based on the full packet context, all fields that need to be or can be read are copied or modified in that match-action unit into the partial packet context. A modification is performed on fields that do read-modify-write. For example: A=A+1; A=A|B. There may be no need to copy fields to the partial context fields that are only overwritten. For example, in case the needed operation is A=B, only B needs to be copied to the partial packet context. The packet context is stored in the FIFO buffer 607 without the response data. The action needed is executed. The packet context is extracted from the FIFO buffer 607. All fields are written back that were modified or need to be written back to the original packet context.

An exemplary pseudo-code of the processing is provided in the following. In this regard, the following naming conventions are used: Pck.Cntx.A—field A in packet context; Rsp.A—field A from response; Tmp.A—temporal variable A; Partial.A—field A in partial packet context.

In this example, the packet context as arrived includes fields B, E and F-Z. The response includes fields A, D, and E. The packet context is stored by the packet context FIFO buffer 607. Field C is provided by the operation Pck.Cntx.C=Tmp.B+1 as exemplarily shown below; it does not yet exist within the input packet context. Also, field A does not yet exist within the input packet context and is provided within the response.

The following microcode (uCode) can be provided by the compiler:
Pck.Cntx.A=Rsp.A;
Tmp.B=Pck.Cntx.B & Rsp.A;
Pck.Cntx.C=Tmp.B+1;
Pck.Cntx.D=Rsp.D+1;
Pck.Cntx.E=Tmp.B>4? Rsp.E: Pck.Cntx.E;

The partial packet context builder 601 copies the following fields from the packet context and the response as follows:
Partial.Rsp.A=Rsp.A;
Partial.Cntx.B=Pck.Cntx.B;
Partial.Rsp.D=Rsp.D;
Partial.Rsp.E=Rsp.E;
Partial.Cntx.E=Pck.Cntx.E;

The systolic array 603 of ALUs may execute the following microcode (uCode) operations, which is thereby performed by the N ALU stages:
Partial.Pck.Cntx.A=Paritial.Rsp.A
Partial.Tmp.B=Partial.Cntx.B & Partial.Rsp.D;
Partial.Pck.Cntx.C=Partial.Tmp.B+1;
Partial.Pck.Cntx.D=Partial.Rsp.D+1;
Partial.Pck.Cntx.E=Partial.Tmp.B>4? Partial.Rsp.E: Partial.Rsp.D The packet context builder 605 may execute the following operations:
Pck.Cntx.A=Partial.Pck.Cntx.A
Pck.Cntx.C=Partial.Pck.Cntx.C;
Pck.Cntx.D=Partial.Pck.Cntx.D;
Pck.Cntx.E=Partial.Pck.Cntx.E;

All other fields are unchanged in this example.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein. Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A network packet processor for processing a data packet, a packet context being associated with the data packet, the packet context comprising a plurality of packet context fields, wherein:
    the network packet processor is configured to determine a partial packet context associated with the data packet based upon the packet context, the partial packet context comprising a plurality of partial packet context fields;
    the network packet processor comprises a systolic array of arithmetic-logical units (ALUs) configured to process the partial packet context to provide a processed partial packet context, the processed partial packet context comprising a plurality of processed partial packet context fields;
    the network packet processor is configured to merge the processed partial packet context with the packet context to provide a processed packet context, wherein the processed partial packet context comprises a first quantity of packet context fields, the packet context comprises a second quantity of packet context fields, the processed packet context comprises a third quantity of packet context fields, and the third quantity is smaller than a sum of the first quantity and the second quantity; and
    the network packet processor comprises a plurality of crossbar elements interconnecting the systolic array of ALUs with the plurality of processed partial packet context fields.

2. The network packet processor of claim 1, further comprising:
    a match unit configured to perform pattern matching within the data packet to provide a response, wherein the network packet processor is configured to merge the response with the packet context.

3. The network packet processor of claim 1, wherein the network packet processor is configured to transfer at least one packet context field of the plurality of packet context fields into the partial packet context.

4. The network packet processor of claim 1, wherein the network packet processor is configured to transfer at least one processed partial packet context field of the plurality of processed partial packet context fields into the processed packet context.

5. The network packet processor of claim 1, wherein each ALU of the systolic array of ALUs is configured to access only the plurality of partial packet context fields and the plurality of processed partial packet context fields.

6. The network packet processor of claim 1, wherein a size of the partial packet context is less than a size of the packet context.

7. The network packet processor of claim 1, wherein the systolic array of ALUs is operable in a plurality of subsequent ALU stages, wherein the systolic array of ALUs is configured to process the partial packet context to provide the processed partial packet context in a first ALU stage, and wherein the systolic array of ALUs is configured to reprocess the processed partial packet context of the first ALU stage as a partial packet context in a second ALU stage.

8. The network packet processor of claim 7, wherein each subsequent ALU stage of the plurality of subsequent ALU stages is traversed within a single processing clock cycle of the network packet processor.

9. The network packet processor of claim 1, wherein each ALU of the systolic array of ALUs is implemented as a hard-wired circuit.

10. The network packet processor of claim 1, wherein the network packet processor further comprises an additional plurality of crossbar elements interconnecting
    the plurality of partial packet context fields with the systolic array of ALUs.

11. The network packet processor of claim 1, wherein the network packet processor further comprises a FIFO buffer configured to:
    buffer the packet context within the network packet processor; and
    provide the packet context to the network packet processor.

12. The network packet processor of claim 1, wherein the systolic array of ALUs is programmable using a microcode.

13. A network switch for switching a data packet within a communication network, the network switch comprising:
    a communication interface configured to receive the data packet; and
    a network packet processor for processing the data packet, a packet context being associated with the data packet, the packet context comprising a plurality of packet context fields, wherein:
        the network packet processor is configured to determine a partial packet context associated with the data packet based upon the packet context, the partial packet context comprising a plurality of partial packet context fields;
        the network packet processor comprises a systolic array of arithmetic-logical units (ALUs) configured to process the partial packet context to provide a processed partial packet context, the processed partial packet context comprising a plurality of processed partial packet context fields;
        the network packet processor is configured to merge the processed partial packet context with the packet context to provide a processed packet context, wherein the processed partial packet context comprises a first quantity of packet context fields, the packet context comprises a second quantity of packet context fields, the processed packet context comprises a third quantity of packet context fields, and the third quantity is smaller than a sum of the first quantity and the second quantity; and
        the network packet processor comprises a plurality of crossbar elements interconnecting the systolic array of ALUs with the plurality of processed partial packet context fields.

14. A method of operating a network packet processor for processing a data packet, the network packet processor comprising an action unit, the action unit comprising a partial packet context builder, a systolic array of arithmetic-logical units (ALUs), a packet context builder, and a plurality of crossbar elements, a packet context being associated with the data packet, the packet context comprising a plurality of packet context fields, the method comprising:

- determining, by the partial packet context builder, a partial packet context associated with the data packet based upon the packet context, the partial packet context comprising a plurality of partial packet context fields;
- processing, by the systolic array of ALUs, the partial packet context to provide a processed partial packet context, the processed partial packet context comprising a plurality of processed partial packet context fields, wherein the plurality of crossbar elements interconnect the systolic array of ALUs with the plurality of processed partial packet context fields; and
- merging, by the packet context builder, the processed partial packet context with the packet context to provide a processed packet context, wherein the processed partial packet context comprises a first quantity of packet context fields, the packet context comprises a second quantity of packet context fields, the processed packet context comprises a third quantity of packet context fields, and the third quantity is smaller than a sum of the first quantity and the second quantity.

15. A non-transitory computer program product storing programming instructions for execution by at least one processor, that when executed by the at least one processor, cause the at least one processor to perform operations comprising:

- determining, by a partial packet context builder, a partial packet context associated with a data packet based upon packet context associated with the data packet, the partial packet context comprising a plurality of partial packet context fields, wherein a network packet processor comprises an action unit, the action unit comprising the partial packet context builder, a systolic array of arithmetic-logical units (ALUs), a packet context builder, and a plurality of crossbar elements, the packet context comprising a plurality of packet context fields;
- processing, by the systolic array of ALUs, the partial packet context to provide a processed partial packet context, the processed partial packet context comprising a plurality of processed partial packet context fields, wherein the plurality of crossbar elements interconnect the systolic array of ALUs with the plurality of processed partial packet context fields; and
- merging, by the packet context builder, the processed partial packet context with the packet context to provide a processed packet context, wherein the processed partial packet context comprises a first quantity of packet context fields, the packet context comprises a second quantity of packet context fields, the processed packet context comprises a third quantity of packet context fields, and the third quantity is smaller than a sum of the first quantity and the second quantity.

16. The network switch of claim 13, the network packet processor further comprising:
- a match unit configured to perform pattern matching within the data packet to provide a response, wherein the network packet processor is configured to merge the response with the packet context.

17. The network switch of claim 13, wherein the network packet processor is configured to transfer at least one packet context field of the plurality of packet context fields into the partial packet context.

18. The network switch of claim 13, wherein the network packet processor is configured to transfer at least one processed partial packet context field of the plurality of processed partial packet context fields into the processed packet context.

19. The network switch of claim 13, wherein each ALU of the systolic array of ALUs is configured to access only the plurality of partial packet context fields and the plurality of processed partial packet context fields.

20. The network switch of claim 13, wherein a size of the partial packet context is less than a size of the packet context.

* * * * *